(12) United States Patent
Asanuma

(10) Patent No.: US 10,124,517 B2
(45) Date of Patent: Nov. 13, 2018

(54) MOLDING APPARATUS, METHOD OF MOLDING, AND MOLDED PRODUCTS

(71) Applicant: Toshiba Kikai Kabushiki Kaisha, Chiyoda-ku, Tokyo-to (JP)

(72) Inventor: Nobuyuki Asanuma, Numazu (JP)

(73) Assignee: TOSHIBA KIKAI KABUSHIKI KAISHA, Chiyoda-Ku, Toyko-To (JP)

( * ) Notice: Subject to any disclaimer, the term of this patent is extended or adjusted under 35 U.S.C. 154(b) by 554 days.

(21) Appl. No.: 14/702,432

(22) Filed: May 1, 2015

(65) Prior Publication Data
US 2015/0314499 A1 Nov. 5, 2015

(30) Foreign Application Priority Data

| | | |
|---|---|---|
| May 2, 2014 | (JP) | 2014-095336 |
| May 2, 2014 | (JP) | 2014-095355 |
| May 2, 2014 | (JP) | 2014-095365 |
| Feb. 2, 2015 | (JP) | 2015-018612 |
| Feb. 2, 2015 | (JP) | 2015-018623 |
| Feb. 2, 2015 | (JP) | 2015-018631 |

(51) Int. Cl.
*B29C 45/14* (2006.01)
*B29C 45/00* (2006.01)
(Continued)

(52) U.S. Cl.
CPC .... *B29C 45/14008* (2013.01); *B29C 45/0046* (2013.01); *B29C 45/03* (2013.01); *B29C 45/1418* (2013.01); *C08K 7/06* (2013.01); *C08K 7/14* (2013.01); *B29C 45/0025* (2013.01); *B29C 45/14786* (2013.01); *B29C 2045/0049* (2013.01); *B29K 2703/00* (2013.01);
(Continued)

(58) Field of Classification Search
CPC ............... B29C 45/14073–2045/1409; B29C 2045/14122; B29C 2045/14057; B29C 45/14008

See application file for complete search history.

(56) References Cited

U.S. PATENT DOCUMENTS 3,553,785 A 1/1971 Serle
3,991,146 A 11/1976 Barrie
(Continued)

FOREIGN PATENT DOCUMENTS

CN 101254642 9/2008
CN 101394987 3/2009
(Continued)

OTHER PUBLICATIONS

Related U.S. Appl. No. 14/702,424.
(Continued)

*Primary Examiner* — Jill L Heitbrink
(74) *Attorney, Agent, or Firm* — DLA Piper LLP US

(57) ABSTRACT

A method for producing a molded product 70 involves the use of an insert material 80. The method for producing the molded product 70 includes a transfer step for transferring the insert material 80 into a mold 40 using a transfer device 87; a placement step for placing the insert material 80 in the mold 40 by deforming the insert material 80 in the mold 40; and a molding step for injecting a molding material into the mold 40, thereby producing the molded product 70 having the insert material 80.

8 Claims, 5 Drawing Sheets

(51) Int. Cl.
  *B29C 45/03* (2006.01)
  *C08K 7/14* (2006.01)
  *C08K 7/06* (2006.01)
  *B29K 703/00* (2006.01)
  *B29L 31/30* (2006.01)
(52) U.S. Cl.
  CPC .................. *B29L 2031/3055* (2013.01); *Y10T 428/24628* (2015.01)

(56) References Cited

U.S. PATENT DOCUMENTS

| | | | |
|---|---|---|---|
| 5,352,397 | A | 10/1994 | Hara et al. |
| 5,558,883 | A | 9/1996 | Shinada et al. |
| 5,653,932 | A | 8/1997 | Aida et al. |
| 5,721,300 | A | 2/1998 | Knies et al. |
| 2002/0017360 | A1* | 2/2002 | Hiraiwa .............. B29C 44/141 156/228 |
| 2002/0140122 | A1 | 10/2002 | Kobayashi |
| 2002/0142127 | A1* | 10/2002 | Hansen .............. B29C 45/14467 428/121 |
| 2004/0224786 | A1* | 11/2004 | Reardon .............. A63B 53/14 473/300 |
| 2008/0171168 | A1 | 7/2008 | Matsuda |
| 2010/0032080 | A1* | 2/2010 | Nilsrud .............. B29C 45/14262 156/216 |
| 2011/0300330 | A1 | 12/2011 | Matsumura |
| 2015/0115500 | A1* | 4/2015 | Gehwolf .............. B01D 29/111 264/238 |

FOREIGN PATENT DOCUMENTS

| | | |
|---|---|---|
| CN | 102343648 | 2/2012 |
| CN | 102806627 | 12/2012 |
| DE | 2320098 | 11/1973 |
| DE | 692 15 614 T2 | 7/1997 |
| DE | 69215614 T2 | 7/1997 |
| DE | 69524488 | 5/2002 |
| DE | 102009052123 | 5/2011 |
| JP | S59-190825 | 10/1984 |
| JP | S59-215842 | 12/1984 |
| JP | S61-78617 | 4/1986 |
| JP | 61-230920 | * 10/1986 |
| JP | H05-44204 | 6/1993 |
| JP | H05-301236 | 11/1993 |
| JP | H06-000842 | 1/1994 |
| JP | H06-285911 | 10/1994 |
| JP | H07-144344 | 6/1995 |
| JP | H07-227888 | 8/1995 |
| JP | H09-272134 | 10/1997 |
| JP | H11-063109 | 3/1999 |
| JP | 2000-000836 | 1/2000 |
| JP | 2000-280302 | 10/2000 |
| JP | 2002-103387 | 4/2002 |
| JP | 2007-296752 | 11/2007 |
| JP | 2008-100531 | 5/2008 |
| JP | 2010-194863 | 9/2010 |
| JP | 2011-126075 | 6/2011 |
| JP | 2011-143711 | 7/2011 |
| JP | 2012-179773 | 9/2012 |
| JP | 2012-206423 | 10/2012 |
| JP | 2013-202825 | 10/2013 |

OTHER PUBLICATIONS

English Language Abstract and Translation for DE 69215614 T2 published Jul. 3, 1997.
Chinese Office Action (with English Language Translation) issued in CN 201510215748.8 dated Dec. 5, 2016.
Chinese Office Action (with English Language Translation) issued in CN 201510215974.6 dated Dec. 15, 2016.
English Language Abstract and Translation CN 101394987 published Mar. 25, 2009.
English Language Abstract and Translation CN 102343648 published Feb. 8, 2012.
English Language Abstract and Translation CN 102806627 published Dec. 5, 2012.
English Language Abstract and Translation CN 101254642 published Sep. 3, 2008.
English Language Abstract and Translation JP 2000-000836 published Jan. 7, 2000.
English Language Abstract and Translation JP H06-285911 published Oct. 11, 1994.
German Office Action (with English Language Translation) issued in DE 10 2015 208 037.4 dated Sep. 23, 2015.
English Language Abstract and Translation for DE 69215614 TS published Jul. 3, 1997.
English Language Abstract for DE 102009052123 published May 12, 2011.
English Language Abstract and Translation for JP 2002-103387 published Apr. 9, 2002.
English Language Abstract and Translation for JP H06-000842 published Jan. 11, 1994.
Japanese Office Action (with English Language Translation) issued in JP 2015018631 dated Dec. 2, 2016.
English Language Translation for JP H05-44204 published Jun. 15, 1993.
English Language Abstract and Translation for JP H05-301236 published Nov. 16, 1993.
English Language Abstract and Translation for JP H09-272134 published Oct. 21, 1997.
English Language Abstract and Translation for JP S59-190825 published Oct. 29, 1984.
English Language Abstract and Translation for JP S59-215842 published Dec. 5, 1984.
English Language Abstract for JP S61-78617 published Apr. 22, 1986.
English Language Abstract and Translation for JP 2007-296752 published Nov. 15, 2007.
English Language Abstract and Translation for JP 2008-100531published May 1, 2008.
German Office Action issued in 10 2015 208 037.4 dated Sep. 28, 2015.
English Language Translation for German Office Action issued in 10 2015 208 037.4 dated Sep. 28, 2015.
English Language Abstract and Translation for JP 2012-179773 published Sep. 20, 2012.
English Language Abstract and Translation for JP 2010-194863 published Sep. 9, 2010.
English Language Abstract and Translation for JP 2013-202825 published Oct. 7, 2013.
Japanese Office Action (with English Language Translation) issued in JP 2015-018623 dated Apr. 14, 2017.
English Language Abstract and Translation of JP 2011-126075 published Jun. 30, 2011.
English Language Abstract and Translation of JP 2000-280302 published Oct. 10, 2000.
Japanese Office Action (with English Language Translation) issued in JP 2015-018612 dated Jan. 20, 2017.
Japanese Office Action (with English Language Translation) issued in JP 2015-018623 dated Jan. 27, 2017.
English Language Abstract of JP H07-227888 published Aug. 29, 1995.
English Language Abstract of JP 2012-206423 published Oct. 25, 2012.
English Language Abstract of JP H11-063109 published Mar. 5, 1999.
German Office Action (with English Language Translation) issued in DE 102015208036.6 dated Aug. 1, 2017.
English Language Abstract of DE 2320098 published Nov. 8, 1973.
English Language Abstract of DE 695 24 488 published May 23, 2002.
Japanese Office Action issued in JP 2017-088873 dated May 15, 2018.

* cited by examiner

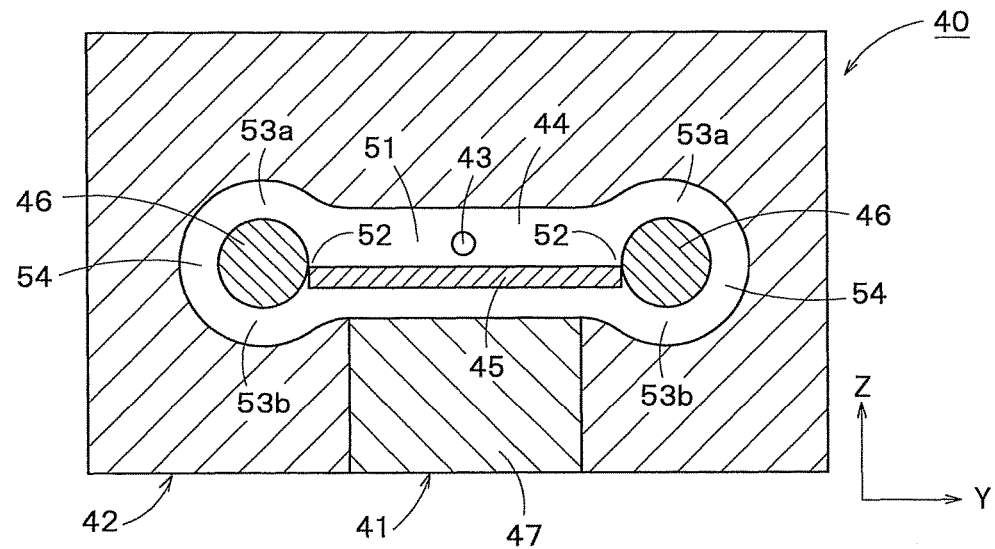
F I G. 2
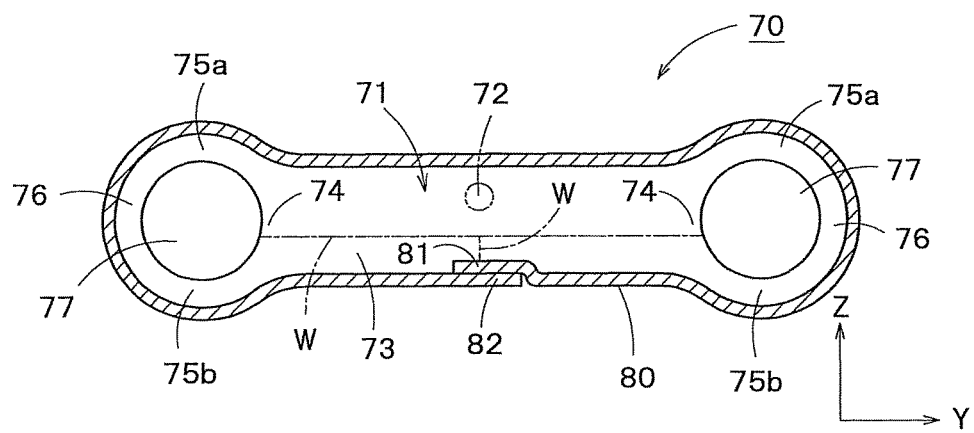
F I G. 3

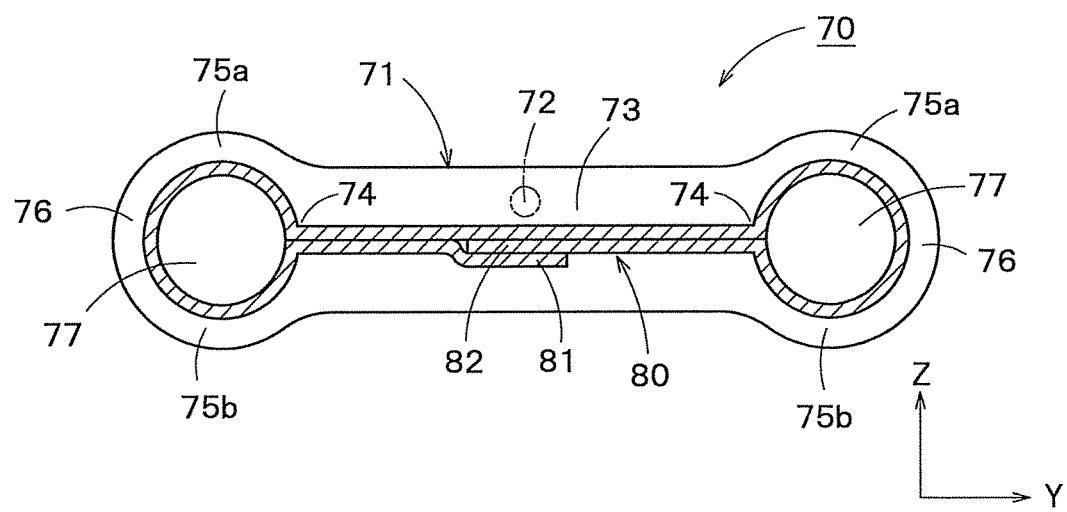
F I G. 6
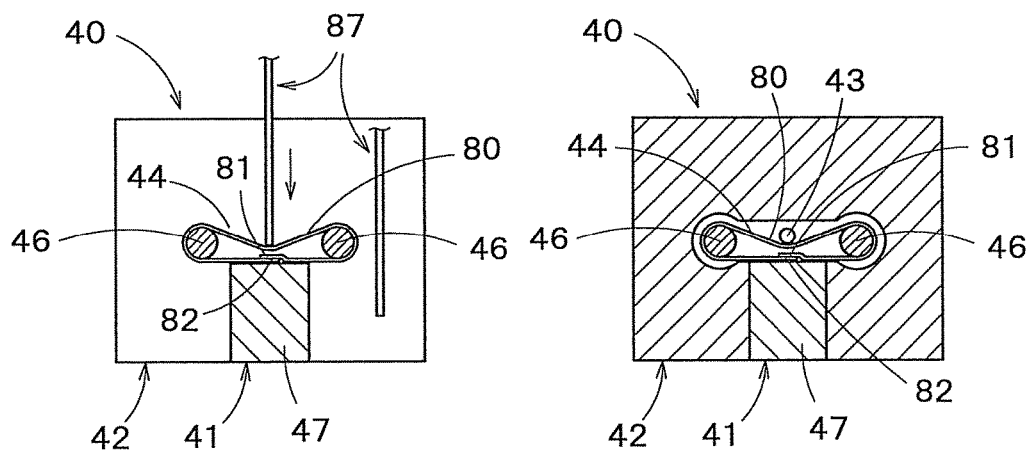
F I G. 7A	F I G. 7B

MOLDING APPARATUS, METHOD OF MOLDING, AND MOLDED PRODUCTS

CROSS-REFERENCE TO RELATED APPLICATIONS

The present application claims the benefits of: Japanese Patent Application No. 2014-095336 filed on May 2, 2014; Japanese Patent Application No. 2014-095355 filed on May 2, 2014; Japanese Patent Application No. 2014-095365 filed on May 2, 2014; Japanese Patent Application No. 2015-018612 filed on Feb. 2, 2015; Japanese Patent Application No. 2015-018623 filed on Feb. 2, 2015; and Japanese Patent Application No. 2015-018631 filed on Feb. 2, 2015, the entire contents of which are incorporated herein by reference.

BACKGROUND OF THE INVENTION

1. Field of the Invention

The present invention relates to a molding apparatus, a method of molding, and molded products.

2. Description of the Related Art

In recent years, for the purpose of improving the fuel efficiency of automobiles or the travel distance of hybrid or electric vehicles, numerous efforts have been actively made to reduce the weight of vehicle bodies. One of known means for the weight saving is a method for replacing the metal components of an automobile by carbon fiber reinforced plastic (CFRP) or glass fiber reinforced plastic (GFRP).

A known technique for producing CFRP or GFRP molded products is one in which after an insert material (textile sheet), such as sheet-like carbon fiber and glass fiber, is formed with a press or the like, and the formed insert material is then inserted into a mold, injection molding forms the insert material integrally with a resin material (JP-2013-202825-A and JP-2012-179773-A, for example).

Generally, in order that textile sheets, such as carbon fiber and glass fiber, included in CFRP or GFRP can be processed with ease, they are often cut into desired shapes before production of molded products. The edges of the textile sheets cut may fray with their carbon fiber threads coming apart. These frayed fiber threads may sometimes be caught in the mold, causing troubles such as damage to the mold. To solve this problem, JP-2010-194863-A is disclosed.

SUMMARY OF THE INVENTION

However, JP-2013-202825-A and JP-2012-179773-A disclose only a method for simply placing an insert material on a surface of the cavity of the mold. That is, the method is not one in which a sheet-like insert material is placed in the mold by being deformed. For this reason, conventional techniques involve difficulties in placing a sheet-like insert material at a desired position, depending on the mold.

Further in JP-2010-194863-A, at times a resin molded product is produced, the edges of a textile sheet cut is covered only by a resin material. Thus, because the textile sheet, serving as a reinforcing material, is not incorporated into the edges of the resin molded product at the times the resin molded product is produced, the strength of the resin molded product at the edges may decrease compared to that at other section (central section). Coupled with this reduction, problems arise such as unstable product quality.

The present invention has been made in view of the above, and an object of the invention is to provide a molding apparatus, a method of molding, and molded products in which a sheet-like insert material can be deformed and easily placed in a predetermined position at times the insert material is placed in a mold.

In one aspect of the invention, the invention is an apparatus for producing molded products by use of a sheet-like insert material, the apparatus including: a transfer device for transferring the insert material into a mold; and an injection device for injecting a molding material into the mold, wherein the injection device injects the molding material into the mold with the insert material being deformed inside the mold.

In another aspect, the invention is a method for producing a molded product by use of a sheet-like insert material, the method including: a transfer step for transferring the insert material into a mold using a transfer device; a placement step for placing the insert material in the mold by deforming the insert material in the mold; and a molding step for injecting a molding material into the mold, thereby producing the molded product having the insert material.

In still another aspect, the invention is a method wherein the placement step includes a deformation step for making an end of the insert material overlap a part of the insert material using the transfer device.

In yet another aspect, the invention is a method wherein by injection of the molding material into the mold during the molding step, the end of the insert material and the part of the insert material overlapped with each other are glued.

In a further aspect, the invention is a method wherein the insert material includes one end and other end, and wherein the one end of the insert material overlaps the other end of the insert material during the deformation step.

In a still further aspect, the invention is a method wherein during the deformation step, the end of the insert material is folded onto itself, thereby laminating the end.

In a yet further aspect, the invention is a method wherein the molding material converges in the area where the end of the insert material and the part of the insert material are overlapped.

In another aspect, the invention is a molded product produced by any of the methods described above.

In a further aspect, the invention is a molded product comprising: a material section; and a reinforcing material formed integrally with the material section, wherein the reinforcing material is bent and an end of the reinforcing material overlaps a part of the reinforcing material, and wherein the end of the reinforcing material and the part of the reinforcing material overlapped with each other are glued.

According to the present invention, the insert material is placed in the mold by deforming it inside the mold, and by injection a molding material into the mold in this state, a molded product including the insert material is produced. With this, upon placing a sheet-like insert material in the mold, the insert material can be deformed and easily placed in a predetermined position.

BRIEF DESCRIPTION OF THE DRAWINGS

FIG. 2 is a cross section of a mold of an injection molding machine according to the embodiment of the invention (a cross section taken along line II-II of FIG. 1);

FIG. 3 is a front view of a molded product according to the embodiment of the invention;

FIG. 6 is a front view of a molded product according to a modification example; and FIGS. 7A and 7B are diagrams illustrating a method for producing molded products according to the modification example.

DETAILED DESCRIPTION OF THE PREFERRED EMBODIMENTS

Embodiments of the present invention will be described below with reference to FIGS. 1 through 7. FIGS. 1 through 7 are diagrams illustrating embodiments of the invention. In each of the figures, like numerals denote like elements, and in part of them, a detailed description is omitted.

Structure of the Injection Molding Machine

Figure 1:
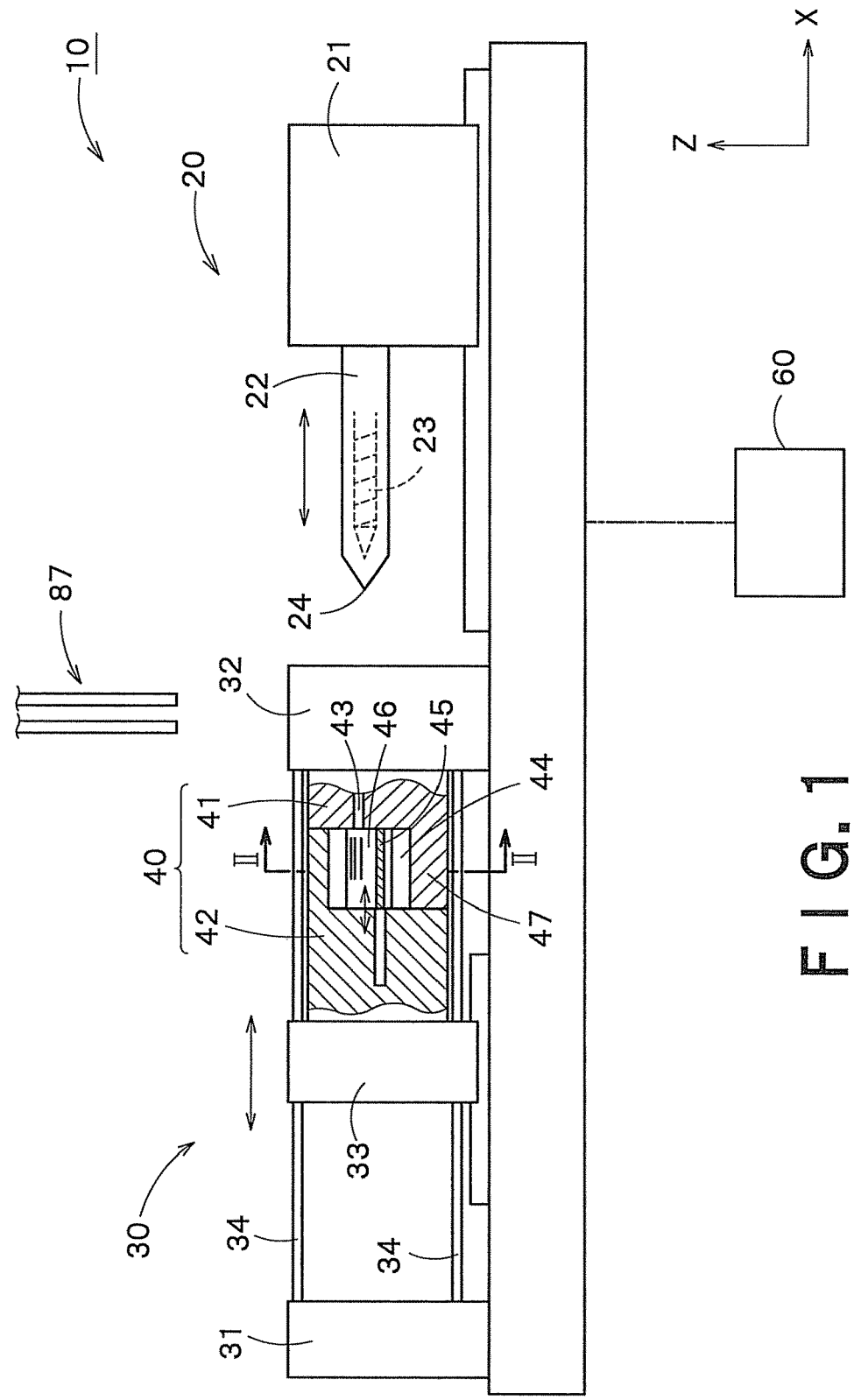
FIG. 1 is a cross-sectional front view illustrating part of an injection molding machine according to an embodiment of the invention.

First, the structure of an injection molding machine (apparatus for producing molded products or molding apparatus) will be described with reference to FIGS. 1 and 2. FIG. 1 is a cross-sectional front view of an injection molding machine according to the present embodiment, while FIG. 2 is a cross section illustrating the internal structure of a mold.

As illustrated in FIG. 1, the injection molding machine 10 includes the following components: a base 11; an injection device 20 provided on the base 11; a clamping device 30 provided on the base 11; and a controller 60 for controlling the entire injection molding machine 10.

Among these components, the injection device 20 includes an injection mechanism 21 and a barrel 22 extending horizontally from the injection mechanism 21. A screw 23 is provided inside the barrel 22. A nozzle 24 is also provided at the distal end of the barrel 22. The injection device 20 is provided movably in the direction in which the injection device 20 approaches or moves away from the clamping device 30 on the base 11 (X direction).

A mold 40 including a fixed mold 41 and a movable mold 42 is fixed to the clamping device 30.

This clamping device 30 includes the following components: a pressure plate 31 fixed on the base 11; a fixed platen 32 supporting the fixed mold 41 and fixed on the base 11; and a movable platen 33 provided opposite the fixed platen 32, supporting the movable mold 42, and disposed movably with respect to the fixed platen 32.

Moreover, the fixed platen 32 and the pressure plate 31 are connected through multiple (four, for example) tie bars 34 with a predetermined space provided therebetween. The movable platen 33 moves in a direction in which the movable platen 33 approaches or moves away from the fixed platen 32 along the tie bars 34.

As a result that the movable platen 33 moves in the direction in which the movable platen 33 approaches the fixed platen 32 (mold closing direction), the mold closing of the fixed mold 41 and the movable mold 42 is performed. In addition, when the movable platen 33 moves in the direction in which the movable platen 33 moves away from the fixed platen 32 (mold opening direction), the mold opening of the fixed mold 41 and the movable mold 42 is performed consequently.

A mounting device 87, such as a unloading machine or a robot for transferring an insert material 80 described later, is provided around the mold 40.

The structure of the mold 40 will next be described referring to FIGS. 1 and 2.

As explained above, the mold 40 includes the fixed mold 41 and the movable mold 42. The fixed mold 41 includes a gate 43 into which a resin material (molding material or molding substance) supplied from the injection device 20 flows. The movable mold 42 is movable by virtue of the movable platen 33 in the direction in which the movable mold 32 approaches or moves away from the fixed mold 41 (X direction).

The mold 40 includes a cavity 44 to which the resin material is supplied and an intercepting plate (intercepting member) 45 capable of moving back and forth within the cavity 44. Among these components, the cavity 44 is formed between the fixed mold 41 and the movable mold 42 and has a shape that corresponds to a molded product 70 described later.

The intercepting plate 45 is capable of going in and coming out from the movable mold 42 by virtue of a drive mechanism (not shown). Being controlled by the controller (control device) 60, the intercepting plate 45 is capable of taking the interception position inside the cavity 44 (see FIG. 1) or the retracted position where the intercepting plate 45 is drawn into the movable mold 42. Specifically, as described later, the controller 60 controls the injection device 20 at a time of the injection filling (injection) of the resin material by the injection device 20, regulates the flow of the resin material within the cavity 44 using the intercepting plate 45 at the initial stage of injection filling (injection), and thereafter controls the intercepting plate 45 so that the intercepting plate 45 is drawn into the inside of the movable mold 42.

When the intercepting plate 45 is in the interception position, the intercepting plate 45 traverses the cavity 44 and moves up to the position where the intercepting plate 45 comes into contact with the fixed mold 41. The gate 43 is located on one side (upper side) of the intercepting plate 45. Thus, the intercepting plate 45 regulates the flow of the resin material from the gate 43 within the cavity 44. Specifically, the resin material is able to flow toward only the one side (upper side) of the intercepting plate 45 and will not flow directly into the other side (lower side) of the intercepting plate 45 from the gate 43.

On the other hand, when the intercepting plate 45 is in the retracted position, the intercepting plate 45 is completely drawn into the movable mold 42. At this time, the resin material from the gate 43 flows within the cavity 44 without being blocked by the intercepting plate 45. Specifically, the resin material becomes able to flow not only toward one side (upper side) of the intercepting plate 45 but also toward the other side (lower side) of the intercepting plate 45. It should be noted that the intercepting plate 45 can instead go in and come out of the fixed mold 41.

While in the present embodiment, as illustrated in FIG. 2, the intercepting plate 45 is formed so as to have a rectangular plate shape in the vertical cross section (the cross section parallel to a Y-Z plane), the shape of the intercepting plate 45 is not limited thereto. For example, the intercepting plate 45 can instead be formed into a triangular shape or an ellipsoidal shape in the vertical cross section (the cross section parallel to the Y-Z plane).

Within the cavity 44, a pair of cylinder-shaped shaft members 46 is placed so as to extend between the fixed mold 41 and the movable mold 42. These shaft members 46 are each connected to the fixed mold 41. As described later, when the resin material is injected into the mold 40, an insert material 80 is wound around the pair of shaft members 46. Note that the intercepting plate 45 extends in a horizontal direction (Y direction) from one of the shaft members 46 to the other. In addition, the fixed mold 41 includes a projection 47 located below the shaft members 46. This projection 47 is used to place an insert material 80 with one end 81 and the other end 82 of the insert material 80 overlapped at the time of the injection filling of the resin material into the mold 40 as described later.

As illustrated in FIG. 2, the cavity 44 includes: a resin flow-in space (molding material flow-in space) 51 in which the gate 43 is provided and into which the resin material flows; a diverging space 52 made to communicate with the downstream side of the resin flow-in space 51 and provided at the position where the resin material diverges; and a pair of flow paths 53a and 53b into each of which the resin material diverging from the diverging space 52 flows. Also, the pair of flow paths 53a and 53b is made to communicate with each other at an intersecting section 54 located downstream of the diverging space 52.

The diverging space 52, the pair of flow paths 53a and 53b, and the intersecting section 54 as a whole forms a ring shape, and each of the shaft members 46 is surrounded by this ring. It should be noted that as illustrated in FIG. 2, the width of the projection 47 (Y-directional length) is equal to that of the resin flow-in space 51 or shorter than that of resin flow-in space 51.

In this case, while the cavity 44 includes a pair of diverging spaces 52 located on both sides of the horizontal direction of the resin flow-in space 51, the cavity 44 is not limited thereto. The number of diverging spaces 52 can also be one or more than three.

The controller 60 can be formed, for example, by including a computer having a CPU, ROM, RAM, and external storage device. On the basis of various information input, this controller 60 controls operation of the injection device 20, the clamping device 30, the intercepting plate 45, and the mounting device 87. Information input to the controller 60 is, for example, control commands or mold information input by the user or an external device. Such being the case, the controller (controller unit) 60 is designed to control the entire injection molding machine 10. However, in the present embodiment, the controller 60 can be any device as long as it is capable of controlling at least the injection device 20 and the intercepting plate 45.

Structure of a Molded Product

The structure of a molded product created by the above-described injection molding machine 10 will now be described with reference to FIG. 3. FIG. 3 is a front view illustrating the molded product 70 according to the present embodiment.

As illustrated in FIG. 3, the molded product 70 is a material in which, for example, a fiber reinforced resin such as carbon fiber reinforced plastic (CFRP) or glass fiber reinforced plastic (GFRP) is used. The molded product 70 has: a synthetic resin section (material section) 71 including a synthetic resin (material); and an insert material (prepreg, insert member, reinforcing member or reinforcing material) 80 formed integrally with the synthetic resin section 71.

Among these, the synthetic resin section 71 includes a molded product main body section 73 and a pair of diverging sections 74 provided on both sides of the molded product main body section 73. A pair of branch sections 75a and 75b, diverging from each of the diverging sections 74, is connected to each other at a connecting section 76.

The molded product main body section 73, located at the central section of the molded product 70, corresponds to the above-described resin flow-in space 51 of the mold 40. In addition, the molded product main body section 73 includes a gate corresponding section 72 that corresponds to the gate 43 of the mold 40. The diverging sections 74, the branch sections 75a and 75b, and the connecting section 76 correspond respectively to the diverging spaces 42, the flow paths 53a and 53b, and the intersecting section 54 of the mold 40.

The branching sections 74, the pair of branch sections 75a and 75b, and the connecting section 76 as a whole forms a ring shape, and a circular through hole 77 is formed in each of the rings. The through hole 77 has a shape that corresponds to that of a shaft member 46 of the mold 40.

By virtue of the resin material converging at the time of injection molding, a weld line W is formed on the molded product main body section 73 of the molded product 70. This weld line W is provided at a position closer to the area corresponding to the above-described intercepting plate 45 of the mold 40. That is, the weld line W is formed along a direction in which the resin material flows within the resin flow-in space 51 of the cavity 44 or a longitudinal direction (Y direction) of the molded product main body section 73. Moreover, the weld line W is formed along a width direction (Z direction) of the molded product main body section 73 at the opposite position of the gate corresponding section 72 with respect to the intercepting plate 45 among the molded product main body section 73.

By contrast, no weld line W is formed at the pair of branch sections 75a and 75b and at the connecting section 76. Thus, the weld line W can be placed away from near the branch sections 75a and 75b and the connecting section 76 which tend to have lower strength, thereby improving the strength of the branch sections 75a and 75b and the connecting section 76.

The insert material (insert member, reinforcing member or reinforcing material) 80 is formed of a sheet-like material and is provided so as to surround the outer section of the synthetic resin section 71 while being bent. In addition, the insert material 80 includes one end 81 and the other end 82 and is formed integrally with the synthetic resin section 71 with the one end 81 overlapping the other end 82. That is, the length of the insert material 80 is longer than that of the outer section of the molded product 70.

The area at which the one end 81 and the other end 82 of the insert material 80 are overlapped is, for example, near the molded product main body section 73; in the present embodiment, it is substantially at the central section of the longitudinal direction (Y direction) of the molded product main body section 73. As above, gluing the ends 81 and 82 of the insert material 80 together prevents a decrease in the local strength of the molded product 70. Moreover, overlapping the ends 81 and 82 of the insert material 80 prevents a decrease in the strength of the joint of the inserting material 80. Since the weld line W is provided also at the area in which the ends 81 and 82 of the insert material are overlapped, the strength around the weld line W can be increased.

It should be noted that the area that the one end 81 of the insert material 80 overlaps only needs to be on part of the insert material 80 and does not necessarily need to be on the other end 82. For example, it is instead possible to extend the one end 81 in the minus Y direction in FIG. 3 in order to make the one end 81 overlapped with the insert material 80 near the through hole 77. Alternatively, regardless of whether the one end 81 and the other end 82 are overlapped, it is also possible to fold the one end 81 (or the other end 82) to increase the strength of the one end 81 (or the other end 82).

It should be noted that the synthetic resin (resin material or molding material) constituting the synthetic resin section 71 can be epoxy-based resin, polyamide-based resin, or phenol-based resin. Moreover, an example of the insert material 80 can be a sheet formed by immersing a continuous fiber, such as carbon fiber and glass fiber, or a long fiber in resin.

The molded product 70 is capable of obtaining a mechanical strength higher than that of an injection-molded product created by synthetic resin alone since the insert material 80 is inserted into the molded product 70. Such a molded product 70 can also be used, for example, as an automobile component, airplane component, architectural component, or industrial machine component as well.

Method for Producing Molded Products

A method for producing a molded product, specifically, that for producing the molded product 70 shown in FIG. 3 using the injection molding machine 10 shown in FIGS. 1 and 2 will be explained.

Figure 4:
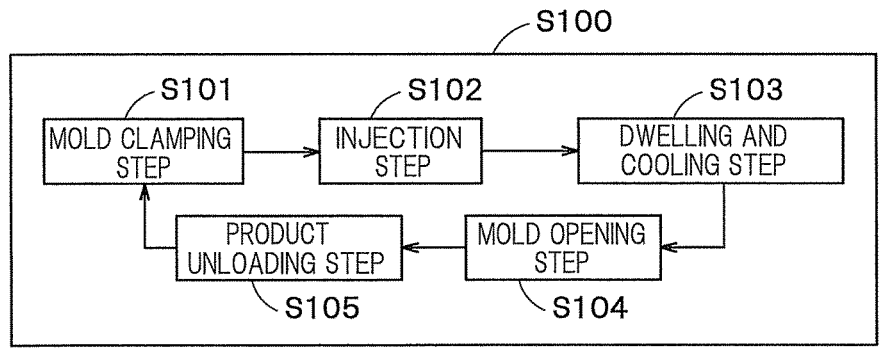
FIG. 4 is an explanatory diagram of an injection molding cycle.

First, the overall injection molding process will be briefly described. As illustrated in FIG. 4, the molded product 70 created with the use of the injection molding machine 10 of the present embodiment are formed by performing an injection molding cycle S100. Specifically, the injection molding cycle S100 includes a mold clamping step S101, an injection step S102, a dwelling and cooling step S103, a mold opening step S104, and a product unloading step S105, and repeating these steps in this order produces a great number of molded products 70.

The method for producing molded products 70 will further be described with reference to FIGS. 5A through 5G. FIG. 5A through 5G are diagrams illustrating the method for producing molded products according to the present embodiment; among these, FIGS. 5B through 5G are diagrams that substantially correspond to FIG. 2. It should be noted that the injection molding cycle S100 described below is each controlled by the controller 60.

A sheet-like insert material 80 is prepared first. This insert material 80 is heated in advance up to its softening point or higher by use of the heater 86 of a heating device 85, independently from the injection molding cycle S100 described above (see FIG. 5A).

Moreover, before the mold clamping step S101, the movable mold 42 supported by the movable platen 33 is moved away from the fixed mold 41 supported by the fixed platen 32 (mold opening is performed) (see FIG. 1).

In this state, the mounting device (transfer device) 87 such as a unloading device or a robot is used to transfer the heated insert material 80 (transfer step) and place it into the mold 40. In this case, the insert material 80 is installed on the pair of shaft members 46 of the fixed mold 41 and then deformed by the mounting device 87 bending it inside the mold 40 (see FIG. 5B). At this time, the one end 81 and the other end 82 of the insert material 80 are both hanging downward from the shaft members 46.

It is to be noted that while in the present embodiment, the insert material 80 is installed on the pair of shaft members 46 of the fixed mold 41 and then deformed by the mounting device 87 bending it inside the mold 40, the method of the present embodiment is not limited thereto. For example, it is instead possible to connect the pair of shaft members 46 to the movable mold 42 and place the insert material 80 on the pair of shaft members 46 of the movable mold 42, followed by the deformation of the insert material 80 by the mounting device 87 inside the mold 40.

Figure 5A:
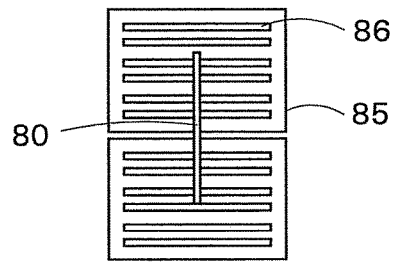
FIGS. 5A through 5G are diagrams illustrating a method for producing molded products according to the embodiment of the invention.
Figures 5B, 5C:
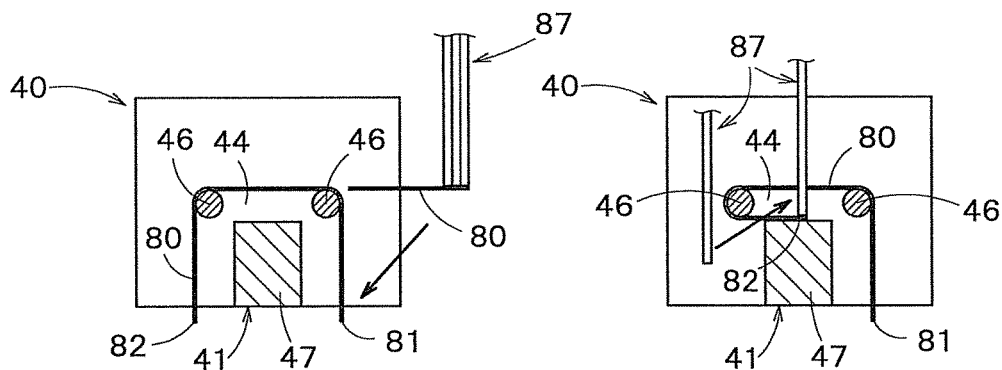
Figure 5D:
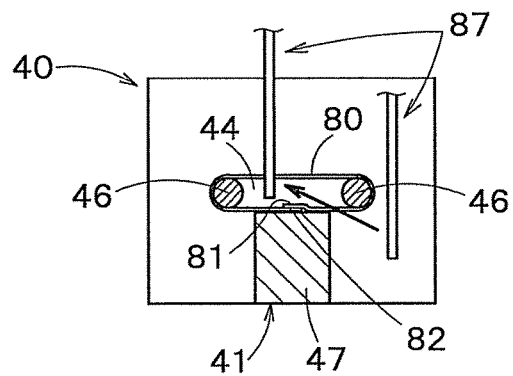

The insert material 80 is then set at a predetermined position within the cavity 44 of the mold 40 by the mounting device 87. That is, a side of the other end 82 of the insert material 80 is bent by the mounting device 87 so as to be wound around one of the shaft members 46 and then placed on the projection 47 (see FIG. 5C). Subsequently, a side of the one end 81 of the insert material 80 is bent by the mounting device 87 so as to be wound around the other shaft member 46 and then placed on the projection 47 (see FIG. 5D). At this time, the one end 81 of the insert material 80 is overlapped with the other end 82. The operations illustrated by FIGS. 5B, 5C, and 5D are sometimes referred to as a placement step in which the mounting device 87 is used to place the insert material 80 into the mold 40 or a deformation step in which the mounting device 87 is used to deform the insert material 80 inside the mold 40.

It is to be noted that while in the present embodiment, the mounting device 87 also acts as a transfer device for transferring the heated insert material 80, the present embodiment is not limited thereto. Alternatively, the transfer device for transferring the insert material 80 and the mounting device 87 can be formed as separate devices. In this case, the mounting device 87 can be one in which the insert material 80 is mounted in the cavity 44 by virtue of slide core or other operation of the mold 40.

As stated above, the portion the one end 81 of the insert material 80 overlaps only needs to be on part of the insert material 80 and does not necessarily need to be on the other end 82. In addition, it is also possible to fold the one end 81 (or the other end 82) of the insert material 80 and glue this folded section of the one end 81 (or the other end 82), thereby increasing its strength.

Figure 5E:
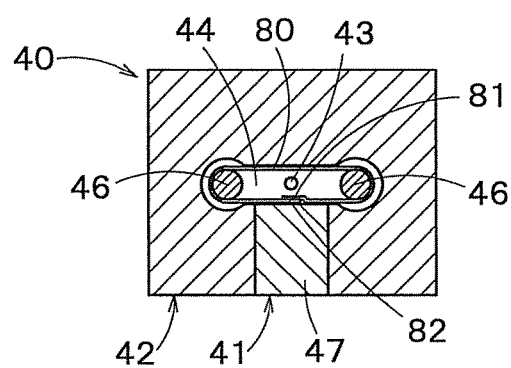

Subsequently, when the movable mold 42 moves toward the fixed mold 41 and comes into tight contact with the fixed mold 41, the movable mold 42 and the fixed mold 41 are clamped (mold clamping step S101) (see FIG. 5E). At this time, the gate 43 provided in the fixed mold 41 is located inside the ring surrounded by the insert material 80.

Next, a drive mechanism (not shown) has the intercepting plate 45 make a progress into the cavity 44, thereby moving the intercepting plate 45 from the retracted position to the interception position (see FIG. 5F) (interception step). At this time, the intercepting plate 45 is located in such a way as to extend between the pair of shaft members 46.

The subsequent injection step S102 for the injection filling of the resin material forms a molded product 70 including the insert material 80. In this injection step S102, with the movable mold 42 and the fixed mold 41 being clamped, the molten resin material is injected from the nozzle 24 of the injection device 20, and the mold 40 is filled with the resin material.

It is to be noted that while in the present embodiment, the intercepting plate 45 is moved from the retracted position to the interception position right before the injection of the resin material, the present embodiment is not limited thereto. For example, it is instead possible to move the intercepting plate 45 from the retracted position to the interception position when the insert material 80 is placed into the mold 40 or finish moving the intercepting plate 45 to the interception position by the time the insert material 80 is placed into the mold 40. That is, it is only necessary that the intercepting plate 45 be located in the interception position before the injection of the resin material.

In the injection step S102, at the initial stage of the injection filling, the flow of the resin material within the cavity 44 is regulated by the intercepting plate 45. That is, the resin material first flows into the cavity 44 from the gate 43 and flows in horizontal directions inside the resin flow-in space 51 along a surface (top surface) of the intercepting plate 45. Next, being regulated by the intercepting plate 45, the resin material flows toward the flow paths 53a on one side (upstream flow paths 53a) from the diverging spaces 52 (see the arrows in FIG. 5F). On the other hand, the resin material will not directly flow into the flow paths 53b on the other side (downstream flow paths 53b) from the diverging spaces 52. As above, the resin material flows through the flow paths 53a on one side, the intersecting section 54, the flow paths 53b on the other side in this order and then flows along the other surface (bottom surface) of the intercepting plate 45 to flow into the resin flow-in space 51.

Figure 5F:
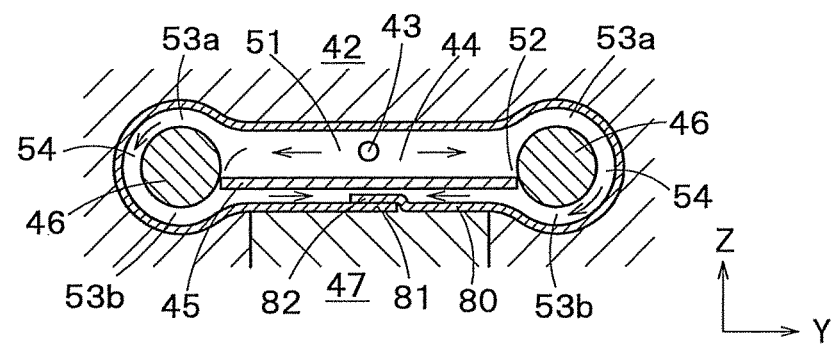

During this time, the insert material 80 moves so as to expand toward the outer side using the resin material flowing inside the cavity 44 and is placed at a predetermined position along the inner surfaces of the cavity 44 (see FIG. 5F). At this time, while the one end 81 and the other end 82 of the insert material 80 move relatively so that the width of their overlapping section becomes small, the one end 81 and the other end 82 maintain the overlapping state even after the completion of the filling with the resin material. Thus, when the cavity is filled with the resin material, the overlapping section between the one end 81 and the other end 82 is pressed by the pressure of the resin material and glued (pressure-bonded). Therefore, the injection step S102 is also referred to as the gluing step.

Figure 5G:
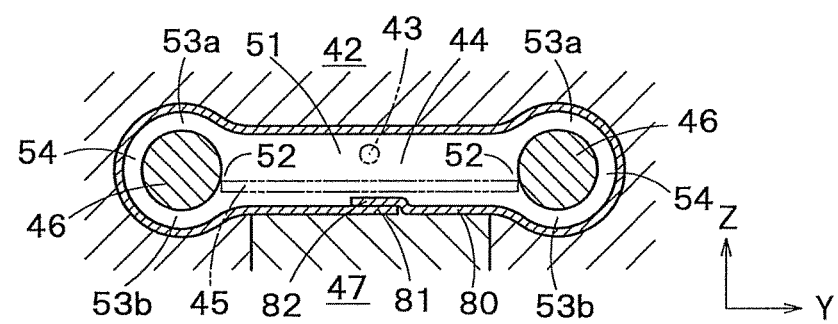

Next, a drive mechanism (not shown) pulls the intercepting plate 45 into the movable mold 42 to place the intercepting plate 45 in the retracted position (see FIG. 5G). The timing at which the intercepting plate 45 is moved to the retracted position is, for example, when, in the cavity 44, all the space except for the intercepting plate 45 has been filled with the resin material. The specific timing of this can be controlled in accordance with the position of the screw 23 within the barrel 22 or the length of time that has elapsed since the injection of the resin material from the nozzle 24.

Thereafter, continuing the injection operation using the injection device 20 forces the resin material into the space, in the cavity 44, where the intercepting plate 45 was located (the space being indicated by the two-dot chain line of FIG. 5G). Consequently, the resin material converges at the opposite position of the gate 43 with respect to the intercepting plate 45 and the position corresponding to the intercepting plate 45, thereby forming the weld line W (see FIG. 3).

Thereafter, the dwelling and cooling step S103 results in production of the molded product 70 shown in FIG. 3. Then the mold 40 is opened in the mold opening step S104. In the product unloading step S105, the molded product 70 is pushed out from the movable mold 42, and as a result of the molded product 70 being taken out, the injection modeling cycle S100 is completed. Here, the injection step S102 and/or the dwelling and cooling step S103 are an example of the molding process.

As described above, according to the present embodiment, in the injection step S102, the flow of the resin material within the cavity 44 is regulated by the intercepting plate 45 at the initial stage of the injection filling, and the intercepting plate 45 is thereafter pulled into the movable mold 42. Consequently, the weld line W can be formed away from around the parts that tend to have lower strength among the molded product 70 (for example, the branch sections 75a and 75b and the connecting section 76), thereby improving the strength of those parts. As a result of the higher strength, a decrease in the local strength of the molded product 70 due to the weld line W can be prevented. In addition, because optimal molding conditions (the positions, shape, and effective path cross-sectional areas of the runner and the gate, and the temperature and flow rate of the flowing material [resin]) need not be found through trial and error to displace the position of the weld line W, the molding conditions for the molded product 70 can be designed with ease. Moreover, during the injection filling, a turbulent flow by the molten resin is produced also at the part constituting the weld line W (the space in which the intercepting plate 45 was present), thus preventing a decrease in the overall strength of the molded product 70.

Further, according to the present embodiment, the resin material is injected into the mold 40 while the one end 81 and the other end 82 of the insert material 80 being overlapped with each other, thereby gluing the overlapped one end 81 and the other end 82. This operation prevents the local strength in the molded product 70 from decreasing and also inhibits decrease in strength due to a loose connection at the joint or the like.

Further, according to the present embodiment, the insert material 80 is placed after being deformed inside the mold 40, and in this state, the resin material is injected into the mold 40, thereby forming the molded product 70 including the insert material 80. Consequently, when the sheet-like insert material 80 is placed in the mold 40, the insert material 80, after being deformed, can be placed at a predetermined position with ease. Additionally, since the resin material is injected to the softened insert material 80, the adhesive strength between the insert material 80 and the resin material (more specifically, the adhesive strength between the insert material 80 and the resin material at their joint surface) can be increased.

Furthermore, according to the present embodiment, at the time the molded product 70 is formed, the insert material 80 is transferred into the mold 40 and then deformed inside the mold 40, followed by the injection of the resin material into the mold. Thus, the process of forming the molded product 80 can be made simpler than when a process in which the insert material 80 is formed through press molding and another process in which the formed insert material 80 is inserted into the mold 40 are both performed.

Modification Example

While in the above-described molded product 70, we have presented an example in which the insert material 80 surrounds the synthetic resin section 71, the invention is not limited thereto. For example, as illustrated in FIG. 6, the insert material 80 can instead be placed within the synthetic resin section 71.

In FIG. 6, the molded product 70 includes the synthetic resin section 71 including a synthetic resin and the insert material 80 formed integrally within the synthetic resin section 71.

Among these, the insert material 80 is placed so as to extend in a longitudinal direction (Y direction) of the molded product main body section 73 at the substantially central section of a width direction (Z direction) of the molded product main body section 73. Since in this case the weld line W is not formed at all or formed only slightly on the molded product 70, the local strength of the molded product 70 is prevented from decreasing due to the weld line W. In addition, since the insert material 80 is disposed so as to surround the pair of through holes 77, the strength near the through holes 77 can be improved. Further, the one end 81 and the other end 82 of the insert material 80 are glued together with the two ends overlapped with each other inside the molded product main body section 73.

To create the molded product 70 shown in FIG. 6, after the insert material 80 is wound around the pair of shaft members 46, the mounting device 87, for example, is used to press the upper section of the insert material 80 downward (see FIG. 7A) (a pressing step). Consequently, the gate 43 is located outside the ring-shaped insert material 80 (see FIG. 7B). It is to be noted that FIGS. 7A and 7B correspond to FIGS. 5D and 5E, respectively.

The injection filling in this state causes the resin material to flow along the outer surfaces of the insert material 80 and, through the flow paths 53a on one side, the intersecting sections 54, and the flow paths 53b on the other side in this order, eventually flow below the insert material 80. During this operation, the insert material 80 is moved to the center by the resin material flowing inside the cavity 44 and placed at the predetermined position shown in FIG. 6. At this time, the overlapping section between the one end 81 and the other end 82 of the insert material 80 is pressed by the pressure of the resin material and glued (pressure-bonded).

In creating the molded product 70 shown in FIG. 6, the use of the intercepting plate 45 is optional. If the intercepting plate 45 is not used, the resin material flowing into the cavity 44 from the gate 43 is regulated such that the resin material flows toward the flow paths 53a on one side by the insert material 80 along a surface (top surface) of the insert material 80. In this case, with the use of the insert material 80, the local strength of the molded product 70 is prevented from decreasing due to the weld line W.

It should be noted that as the molded product producing apparatus of the present embodiment, the invention is not limited to an injection molding machine. For example, the apparatus can instead be a metal molding machine (apparatus for producing molded products or molding apparatus) such as a die-cast machine (apparatus for producing molded products or molding apparatus) or the like or other plastic molding machine (apparatus for producing molded products or molding apparatus) such as a transfer molding machine (apparatus for producing molded products or molding apparatus) or the like.

Some of the components disclosed in the above embodiments can also be combined properly on an as-needed basis. Alternatively, some components can be removed from the components disclosed in the above embodiments.

What is claimed is:

1. A method for producing a molded product by use of a sheet-like insert material, the method comprising:
   transferring the insert material into a mold using a transfer device, the mold including a shaft member;
   placing the insert material in the mold by deforming the insert material in the mold; and
   injecting a molding material into the mold, thereby producing the molded product having the insert material,
   wherein the placing includes winding the insert material around the shaft member using the transfer device and then overlapping an end of the insert material with a part of the insert material using the transfer device inside the mold.

2. The method of claim 1, wherein by injection of the molding material into the mold during the injecting, the end of the insert material and the part of the insert material overlapped with each other are glued.

3. The method of claim 1,
   wherein the insert material includes one end and other end, and
   wherein the one end of the insert material overlaps the other end of the insert material during the overlapping.

4. The method of claim 1, wherein during the overlapping, the end of the insert material is folded onto itself, thereby laminating the end.

5. The method of claim 1, wherein the molding material converges in an area where the end of the insert material and the part of the insert material are overlapped.

6. The method of claim 2, wherein the molding material converges in an area where the end of the insert material and the part of the insert material are overlapped.

7. The method of claim 3, wherein the molding material converges in an area where the end of the insert material and the part of the insert material are overlapped.

8. The method of claim 4, wherein the molding material converges in an area where the end of the insert material and the part of the insert material are overlapped.

\* \* \* \* \*